United States Patent
Choi

(10) Patent No.: US 10,524,096 B2
(45) Date of Patent: Dec. 31, 2019

(54) METHOD OF IDENTIFYING INTERNET OF THINGS GROUP SERVICE BASED ON OBJECT IDENTIFIER

(71) Applicant: Electronics and Telecommunications Research Institute, Daejeon (KR)

(72) Inventor: Younghwan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/132,684

(22) Filed: Sep. 17, 2018

(65) Prior Publication Data

US 2019/0281421 A1 Sep. 12, 2019

(30) Foreign Application Priority Data

Mar. 7, 2018 (KR) .................. 10-2018-0027116
Jun. 11, 2018 (KR) .................. 10-2018-0066809

(51) Int. Cl.
| H04W 4/08 | (2009.01) |
| H04W 60/04 | (2009.01) |
| H04W 4/90 | (2018.01) |
| H04L 29/08 | (2006.01) |

(52) U.S. Cl.
CPC .............. *H04W 4/08* (2013.01); *H04L 67/16* (2013.01); *H04W 60/04* (2013.01); *H04W 4/90* (2018.02)

(58) Field of Classification Search
CPC .......... H04W 4/08; H04W 60/04; H04W 4/90
See application file for complete search history.

(56) References Cited

U.S. PATENT DOCUMENTS

| 6,928,463 | B1* | 8/2005 | Tene ................... H04L 12/2856 370/356 |
| 9,602,602 | B2 | 3/2017 | Choi et al. |
| 10,034,158 | B2 | 7/2018 | Choi et al. |
| 2007/0260476 | A1* | 11/2007 | Smolen ............... G06F 16/2308 705/1.1 |
| 2008/0059607 | A1* | 3/2008 | Schneider ............. G06Q 10/06 709/218 |
| 2011/0119298 | A1* | 5/2011 | Arrasvuori .......... G06F 16/9535 707/769 |
| 2014/0244700 | A1* | 8/2014 | Aikas ...................... G06F 21/62 707/827 |
| 2014/0310384 | A1* | 10/2014 | Choi ....................... H04L 67/12 709/218 |

FOREIGN PATENT DOCUMENTS

| KR | 10-1426012 | 8/2014 |
| KR | 10-1630792 | 6/2016 |

* cited by examiner

*Primary Examiner* — David Bilodeau
(74) *Attorney, Agent, or Firm* — Kile Park Reed & Houtteman PLLC

(57) ABSTRACT

Disclosed is a method of identifying an Internet of things (IoT) service group based on an object identifier, the method including retrieving a first group identifier of a first service group corresponding to a first object identifier in response to the first object identifier transmitted through a uniform resource identifier (URI) corresponding to the first object identifier, identifying services include in the first service group using the first group identifier, and transmitting information of the identifier services. Here, the first service group may be a service group requested from a user.

9 Claims, 6 Drawing Sheets

METHOD OF IDENTIFYING INTERNET OF THINGS GROUP SERVICE BASED ON OBJECT IDENTIFIER

CROSS-REFERENCE TO RELATED APPLICATION(S)

This application claims the priority benefit of Korean Patent Application No. 10-2018-0027116 filed on Mar. 7, 2018 and Korean Patent Application No. 10-2018-0066809 filed on Jun. 11, 2018, in the Korean Intellectual Property Office, the disclosures of which are incorporated herein by reference for all purposes.

BACKGROUND

1. Field

One or more example embodiments relate to a method of identifying and resolving an Internet of things (IoT) group service based on an object identifier.

2. Description of Related Art

In general, the Internet of things (IoT) may provide a separate service only in each of domains or regions based on various and different resources.

An effective integrated service operation that groups all IoT services and simultaneously or sequentially provide the grouped IoT services is required to operate and manage such a characteristic in an integrated manner.

A method of grouping and integrally providing individual services is referred to as service grouping.

SUMMARY

At least one example embodiment provides separate identification and resolution technology to provide existing Internet of things (IoT) services in a group form.

At least one example embodiment also provides a systematic method, such as a grouping method, for operating different and various individual IoT services in an integrated manner and technology for identifying and resolving a service group based on an object identifier.

According to an aspect of at least one example embodiment, there is provided a method of identifying a service group based on an object identifier, the method including: retrieving a first group identifier of a first service group corresponding to a first object identifier in response to the first object identifier transmitted through a uniform resource identifier (URI) corresponding to the first object identifier; identifying services included in the first service group using the first group identifier; and transmitting information of the identified services. The first service group is a service group requested from a user.

The URI may be location information of a group service resolution server that generates the first service group.

The information may include a service identifier of each of the services and an identifier of a corresponding registry.

The first object identifier may be allocated to the first service group to identify the group service resolution server.

The method may further include individually requesting a corresponding service registry for a specific service among the services using the information.

The method may further include registering a specific service in response to a registration request for the specific service.

The registering may include generating a second service group by grouping the specific service, generating a second group identifier corresponding to the second service group, and mapping a second object identifier allocated to the second service group and the second group identifier in a group list, and managing the group list.

The registering may further include mapping the second group identifier and information of the specific service, and managing the second group identifier and the information of the specific service.

The information of the specific service may include a service identifier of the specific service and an identifier of a corresponding registry.

The method may further include mapping a second object identifier allocated to a second service group and a URI of a group service resolution server that generates the second service group, and managing the second object identifier and the URI.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
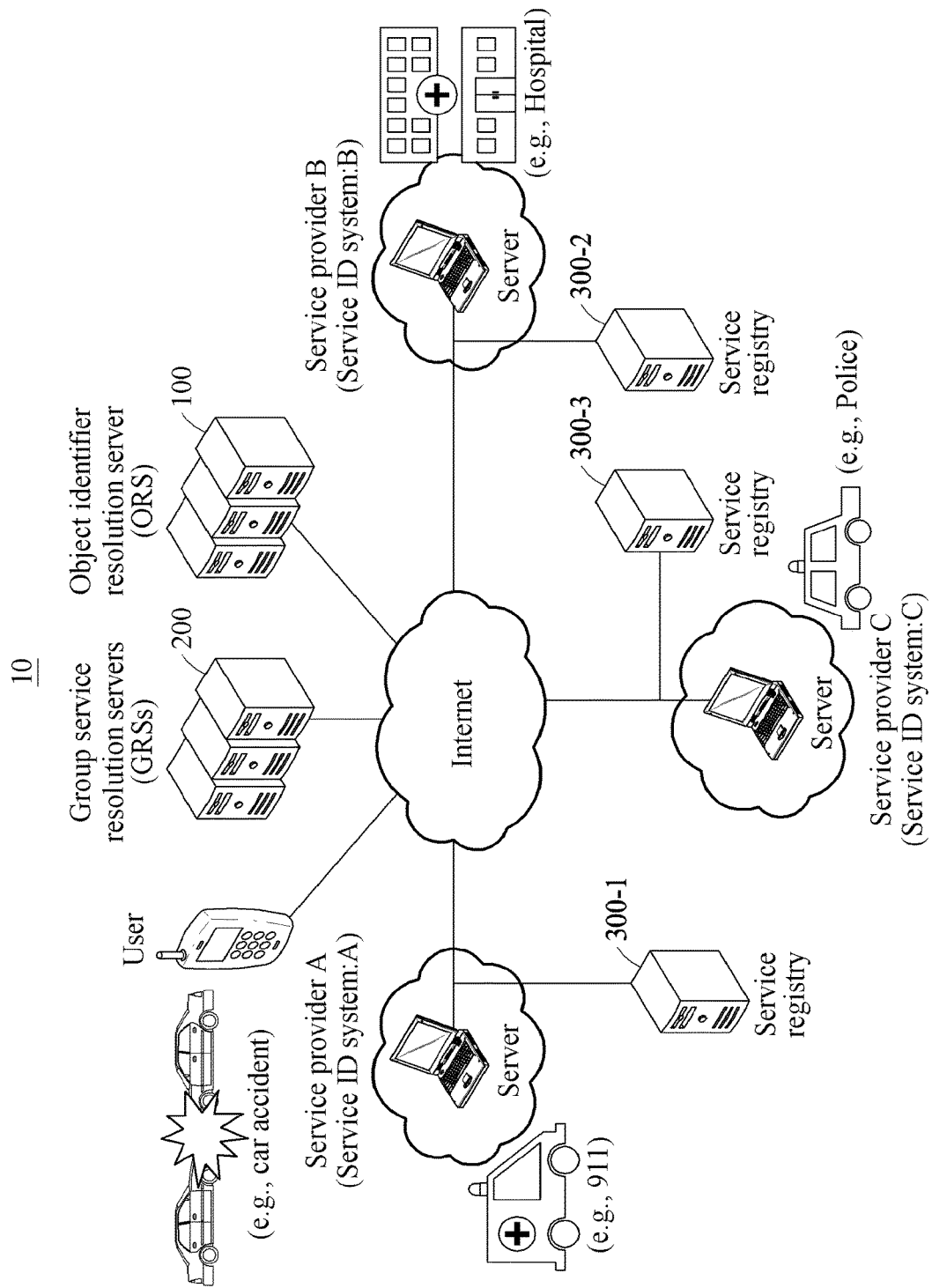
FIG. 1 illustrates an example of an architecture of an object identifier (OID)-based resolution framework of group services according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The term "object identifier (OID)" used herein is based on an international standard, may be easily expandable and may be readily used to integrate different and various services.

FIG. 1 illustrates an example of an architecture of an OID-based resolution framework of group services according to an example embodiment.

Referring to FIG. 1, a service resolution system 10 may include an object identifier resolution server (ORS) 100 and a plurality of group service resolution servers (GRSs) 200. Also, the service resolution system 10 may further include one or more service providers, for example, a service provider A, a service provider B, and a service provider C, and one or more service registries, for example, a first service registry 300-1, a second service registry 300-2, and a third service registry 300-3.

The ORS 100 may be interconnected with each of the GRSs 200 and may perform management and resolution on an OID and location information of each of the GRSs 200 corresponding to the OID.

Each of the GRSs 200 may be interconnected with the service registry of the service provider, for example, the service providers A, B, and/or C, to manage information on a service group, for example, a group of services.

The GRS 200 may generate and manage the service group and perform a connection with a detailed IoT service included in the service group and a resolution of information on the connection. The GRS 200 may manage information on the service group and connect a user to a required specific service included in the service group.

The service provider may manage at least one service. The service provider may have its own identification scheme to autonomously provide a specific service and include corresponding service registries, for example, the first service registry 300-1, the second service registry 300-2, and the third service registry 300-3, to manage service-related information.

That is, a plurality of service providers may operate a plurality of service registries, respectively. For example, the service provider A may operate the first service registry 300-1, the service provider B may operate the second service registry 300-2, and the service provider C may operate the third service registry 300-3.

Each of the service registries, for example, the first service registry 300-1, the second service registry 300-2, and the third service registry 300-3, may manage information of a specific service, for example, an IoT service, provided from a corresponding service provider. Also, each of the service registries, for example, the first service registry 300-1, the second service registry 300-2, and the third service registry 300-3, may manage the detailed IoT service and information providable from the corresponding service provider.

Figure 2:
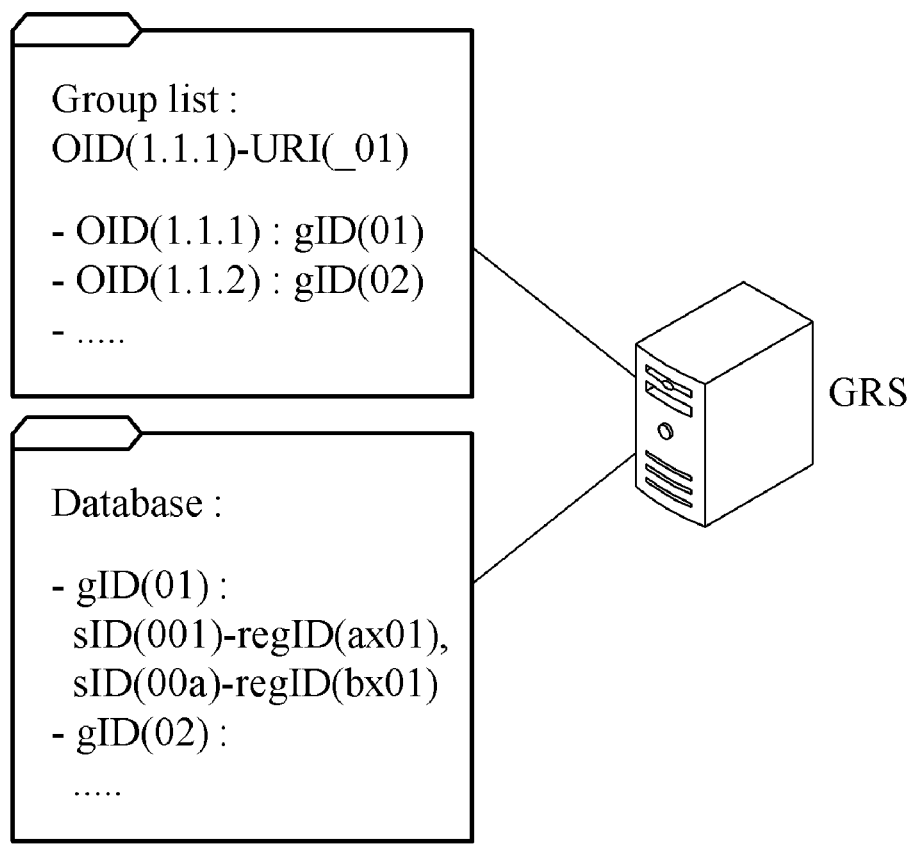
FIG. 2 illustrates an example of an operation of a group service resolution server (GRS) of FIG. 1.

FIG. 2 illustrates an example of an operation of a GRS of FIG. 1.

Referring to FIG. 2, the GRS may perform a service group management with respect to IoT services. The IoT services included in a service group may be services that have identical properties. That is, the IoT services that have the identical properties may be grouped.

To manage the service group, the GRS may include a list, for example, a group list, to manage an OID and a group ID (gID) of the service group corresponding to the OID. Also, the GRS may include a database to map the gID and information of the IoT services included in the service group. For example, the information may include a service ID (sID), a registry ID (regID), service provider information, and service-related details. Hereinafter, the terms "map/mapping" and "match/matching" may be interchangeably used throughout.

The GRS may identify the service group. The OID may be used as a key value to identify a gID. Thus, the GRS may return a corresponding gID and information of IoT services included in a corresponding service group.

The GRS may receive the OID, resolve the gID that is an identifier of the service group corresponding to the OID, and resolve information of detailed IoT services included in the corresponding service group.

The GRS may request a service provider to perform a required IoT service of a user through information of the detailed IoT service obtained through a final resolution.

Figure 3:
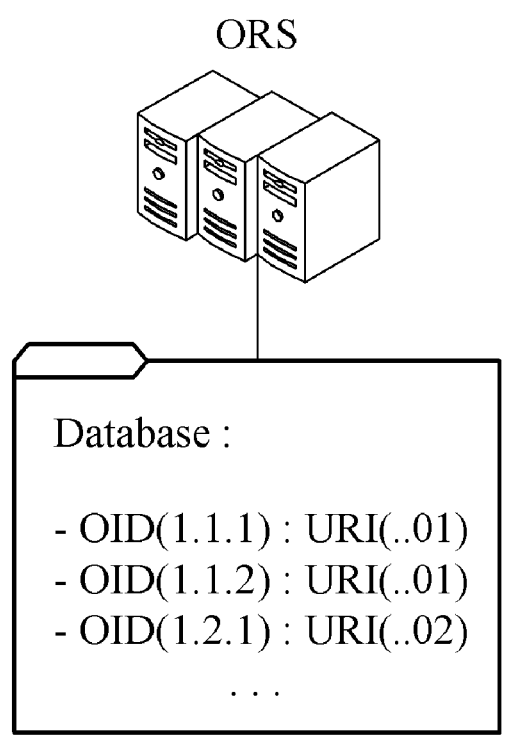
FIG. 3 illustrates an example of an operation of an object identifier resolution server (ORS) of FIG. 1.

FIG. 3 illustrates an example of an operation of an ORS of FIG. 1.

Referring to FIG. 3, the ORS may perform a centralized management with respect to each of GRSs. For example, the ORS may manage information of each of the GRSs.

Also, the ORS may perform an identification and a resolution with respect to each of the GRSs. The ORS may include a database that stores an OID and location information, for example, a uniform resource identifier (URI), of each of the GRSs corresponding to the OID. Here, the URI is based on user information (UINF).

The OID may have a value that is predefined and globally intrinsic and may be allocated to each of all of the GRSs. That is, since a group ID (gID) is allocated to a single GRS, and thus each of groups of an IoT service may be identified using the allocated OID.

The OID may be used as a known value, such as a port number of a transmission control protocol/Internet protocol (TCP/IP). Thus, all nodes may recognize the value of the OID associated with the IoT service group.

That is, the OID may be used as a key value to identify each of the GRSs. For example, when a user transmits the value of the OID to the ORS, the ORS may return a value of the URI of the GRS corresponding to the OID.

All terminals may be aware of an ID value of the service group for the IoT service using the OID. Users may be aware of a GRS through which a service is provided from the ORS using the OID as an identifier corresponding to a service group.

Figure 4:
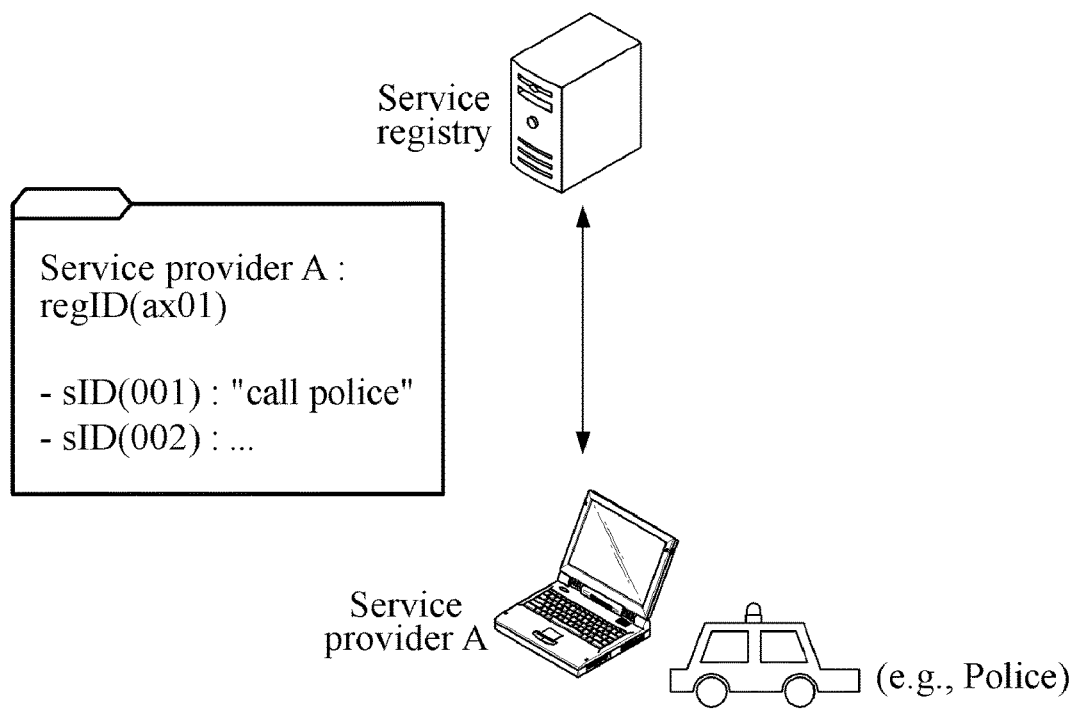
FIG. 4 illustrates an example of an operation of a service registry of FIG. 1.

FIG. 4 illustrates an example of an operation of a service registry of FIG. 1.

Referring to FIG. 4, a local service provider may possess and manage a single service registry. The service registry may be a local resolution system that supports specific services. For example, the service registry may be a server managed by a service manager that finally executes detailed IoT services.

The service registry may manage a database that stores a service ID (sID) and a service, for example, "call police", corresponding to the sID.

The database may be used for the service registry to retrieve the sID corresponding to the service.

In response to an input of a requested service ID from the GRS, the service provider may execute a corresponding service. Here, a method of generating a service ID may vary based on a service provider.

Hereinafter, an OID-based group service resolution framework procedure will be described.

Figure 5:
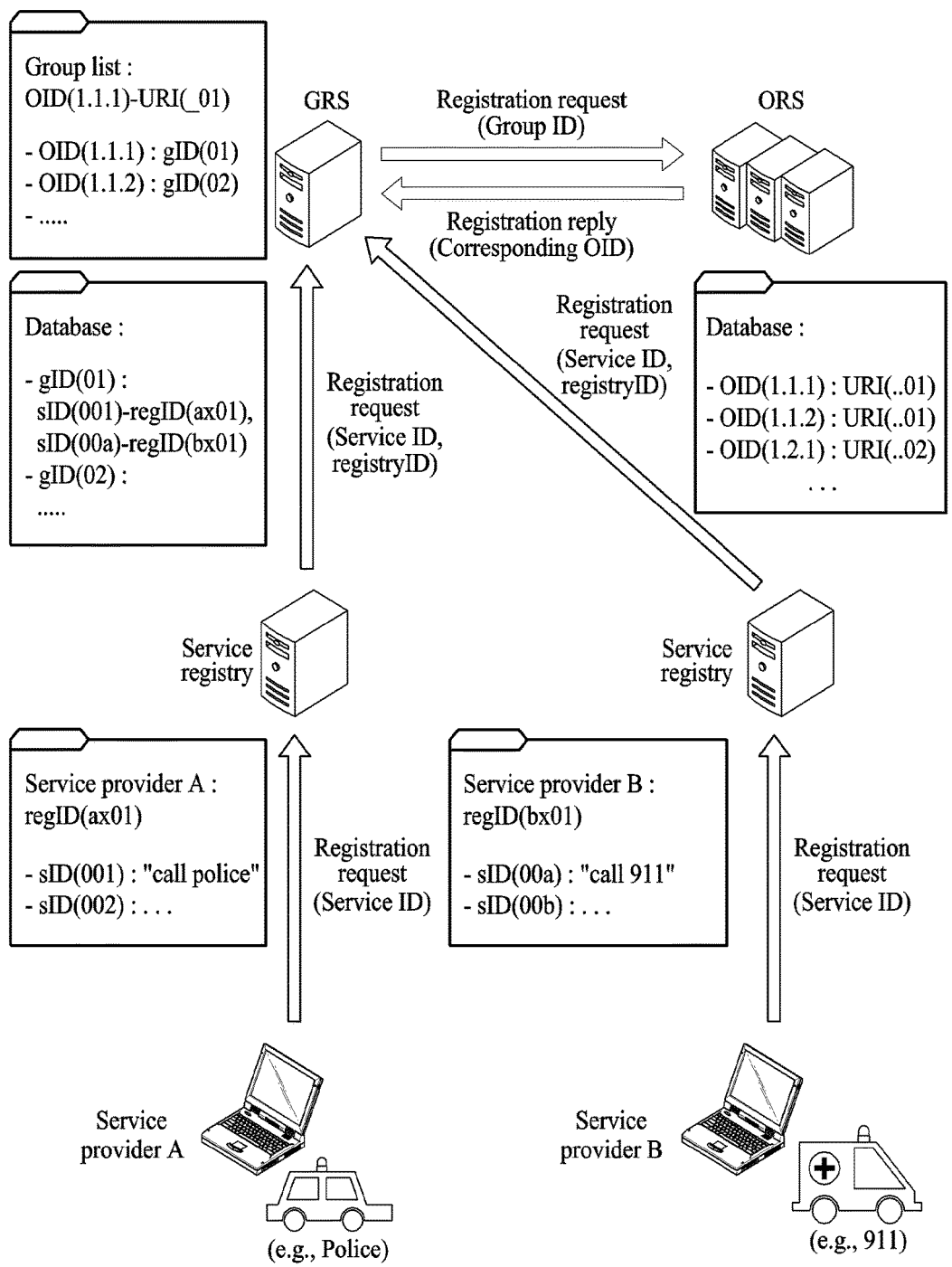
FIG. 5 illustrates an example of a registration procedure of a group service based on an OID according to an example embodiment.

FIG. 5 illustrates an example of a registration procedure of a group service based on an OID according to an example embodiment.

Referring to FIG. 5, an IoT service may require a registration procedure for grouping and management. Also, an IoT service group may need to be identified using an OID.

The registration procedure may include a two-stage registration procedure including two stages, for example, an SP-GRS and a GRS-ORS. For example, in the two-stage registration procedure, a service provider may provide an IoT service registration procedure to a GRS and a GRS registration procedure to an ORS.

Hereinafter, a first stage of the registration procedure that is the IoT service registration procedure from the service provider to the GRS will be described.

The service provider may transmit a registration request to a service registry to register a specific IoT service in the service registry. The registration request may include a service ID (sID) corresponding to the IoT service.

The sID may use a method of generating a different form of an identifier based on a service provider. That is, a different SP may generate an sID in a different form.

The service registry may manage, for example, register, the sID corresponding to the IoT service in a database in response to the registration request transmitted from the service provider. The service registry may store and manage two-tier information, for example, sID-IoT service.

The service registry may transmit the registration request to the GRS to register the IoT service in the GRS. The registration request may include the service ID (sID) and a registry ID (regID).

That is, the service registry may transmit the regID of the service registry to the GRS as additional pairing information with the sID. The sID may be used as an only identifier in an identification and resolution process since the sID is delivered to the GRS with information of the service registry, such as the regID.

All service registries may be connected to the GRS. Each service registry may transmit a regID and an sID of a corresponding service registry to the GRS every time the IoT service is registered or every regular time.

The GRS may manage, for example, register, information of the IoT service in the database in response to the registration request transmitted from the service registry. For example, information of the IoT service may include the sID, the regID, SP information, and service-related details.

The GRS may generate a service group by grouping IoT services and generate a gID corresponding to the service group. As described above, in response to a need for a group of IoT services, a service group may be generated in the database, and an identifier of the service group may be generated. A group ID (gID) may be generated by the GRS in response to a request from a GRS operator.

The GRS may not autonomously generate the OID. Thus, once an IoT service group is generated, the GRS may transmit a registration request to the ORS to request allocation of an OID corresponding to a service group. The registration request may include a URI.

Hereinafter, a second stage of the registration procedure that is the registration procedure from the GRS to the ORS will be described.

The ORS may generate an OID assignable to the service group generated by the GRS in response to the registration request transmitted from the GRS, allocate the OID to the service group, and transmit the allocated OID. The ORS may store and manage two-tier information, for example, a URI-OID of the GRS, in the database.

The GRS may receive the OID, and store and manage the gID and the corresponding OID in a list, for example, a group list.

Figure 6:
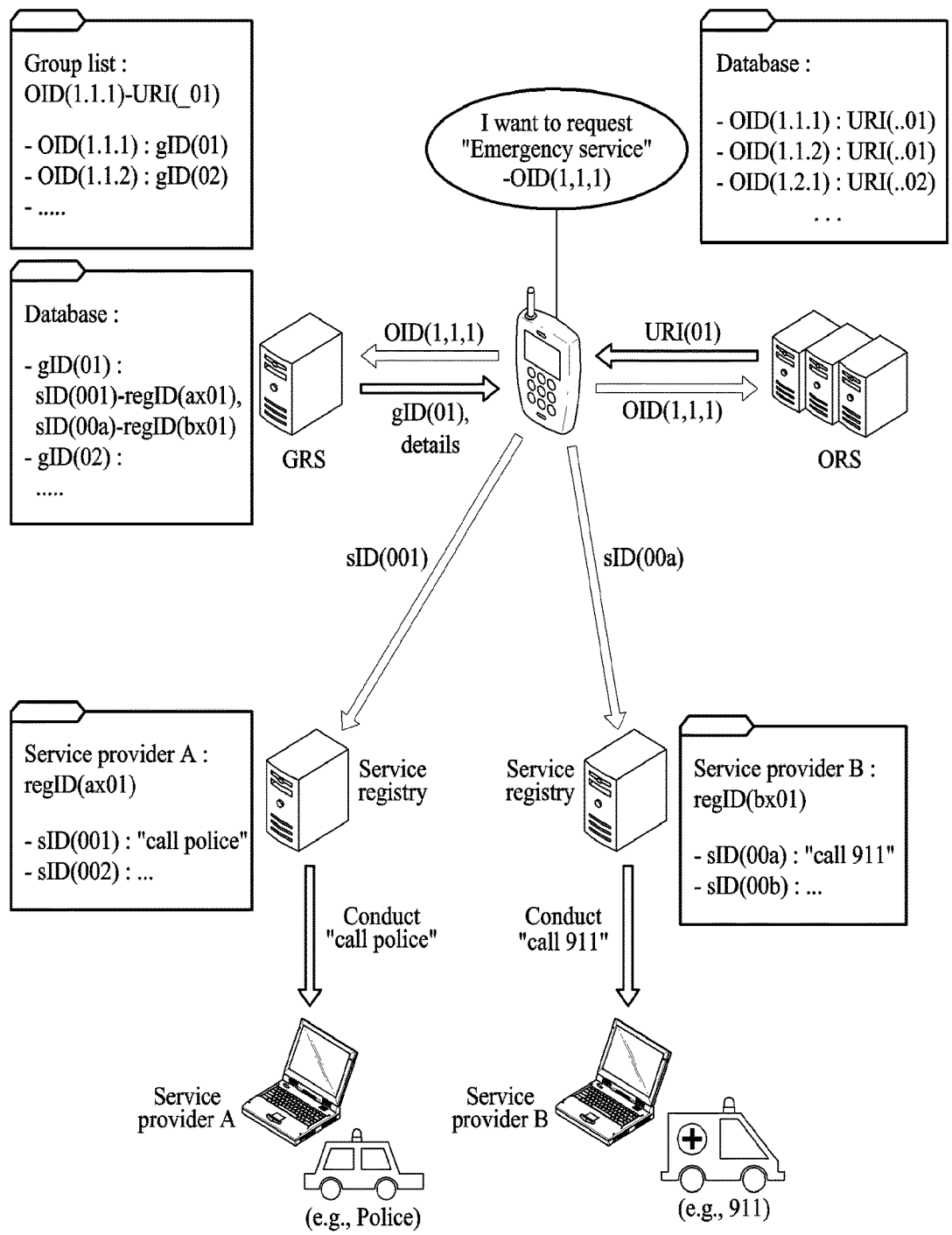
FIG. 6 illustrates an example of a resolution procedure of group services based on an OID according to an example embodiment.

FIG. 6 illustrates an example of a resolution procedure of group services based on an OID according to an example embodiment.

Hereinafter, an OID-based resolution procedure with respect to an IoT service group will be described with reference to FIG. 6. In this procedure, it is assumed that all components are interconnected for networking through the Internet, and a GRS and an ORS are aware of networking information. Also, an emergency situation may be considered.

1) A user may transmit an OID(1.1.1) corresponding to an IoT service to the ORS.

For example, when an emergency situation occurs, the user that is one of surrounding people may execute an application program, for example, an application, to request "Emergency Service" that is the IoT service group using an electronic device, for example, a mobile phone. When the user presses an "Emergency Service" button, the corresponding OID(1.1.1) may be transmitted to the ORS designated in the application program.

2) The ORS may retrieve a URI(..01) that is location information of a GRS corresponding to OID(1.1.1) from a database and transmit the retrieved URI(..01) of the GRS to the user.

That is, the user may become aware of information of the GRS corresponding to the OID(1.1.1).

3) The user may transmit the OID(1.1.1) to the GRS using the URI(..01) transmitted from the ORS.

For example, the application program of the user may obtain connection information on the GRS from URI(..01) information transmitted from the ORS. The application program of the user may transmit the OID(1.1.1) to the GRS to obtain information on the IoT service group corresponding to "Emergency Service" using the URI(..01).

4) The GRS may return a gID(01) with respect to the "Emergency Service" and information on IoT services included in the corresponding group to the user in response to the OID(1.1.1).

The GRS may receive the OID(1.1.1) and retrieve the gID corresponding to the OID(1.1.1) from a group list. The GRS may retrieve information of the IoT services included in the corresponding group from the database using the retrieved the gID(01). The GRS may transmit the gID(01) and information, for example, a network address, a specific service ID, and the like, of the IoT services included in the corresponding group to the application program of the user.

5) Each of service IDs, for example, the sID(001) and an sID(00a), may be transmitted to a corresponding service registry.

The user may receive all information required to request the group service. The user may individually request a corresponding service registry for an IoT service associated with the group having the sID(001) and the sID(00a). When the service registry receives the request from the GRS, a service provider may attempt to carry out a service.

6) The service provider may carry out a service, for example, "call police" and "call 911".

When the service provider receives a detailed IoT service ID value, the service provider may carry out a corresponding service. All IoT services included in a group may be carried out through a one-stop request.

According to an example embodiment, in the case of a service, for example, an IoT service, with a different characteristic and a remarkable diversity, a maximized synergy may be achieved from an effect of an integrated operation on a connection service. Also, since various services and technologies are applicable in a mobile device, such as a mobile phone, a service using the mobile device and an additional value may be provided.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of identifying a service group based on an object identifier, the method comprising:
    retrieving a first group identifier of a first service group corresponding to a first object identifier in response to the first object identifier transmitted through a uniform resource identifier (URI) corresponding to the first object identifier;
    identifying services included in the first service group using the first group identifier;
    transmitting information of the identified services and;
    registering a specific service in response to a registration request for the specific service,
    wherein the first service group is a service group requested from a user.

2. The method of claim 1, wherein the URI is location information of a group service resolution server that generates the first service group.

3. The method of claim 1, wherein the information includes a service identifier of each of the services and an identifier of a corresponding registry.

4. The method of claim 2, wherein the first object identifier is allocated to the first service group to identify the group service resolution server.

5. The method of claim 1, further comprising:
    individually requesting a corresponding service registry for a specific service among the services using the information.

6. The method of claim 1, wherein the registering comprises:
    generating a second service group by grouping the specific service;
    generating a second group identifier corresponding to the second service group; and
    mapping a second object identifier allocated to the second service group and the second group identifier.

7. The method of claim 6, wherein the registering further comprises mapping the second group identifier and information of the specific service.

8. The method of claim 7, wherein the information of the specific service comprises a service identifier of the specific service and an identifier of a corresponding registry.

9. The method of claim 6, further comprising:
mapping a second object identifier allocated to a second service group and a URI of a group service resolution server that generates the second service group.

* * * * *